United States Patent
Borgsmidt

(10) Patent No.: US 7,610,294 B2
(45) Date of Patent: Oct. 27, 2009

(54) MULTIDIMENSIONAL DATA CUBE VALIDATION

(75) Inventor: Rasmus Borgsmidt, Luxembourg (LU)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 11/756,285

(22) Filed: May 31, 2007

(65) Prior Publication Data

US 2008/0301155 A1 Dec. 4, 2008

(51) Int. Cl.
G06F 17/30 (2006.01)
(52) U.S. Cl. ............................. 707/100; 707/2; 705/35; 705/36 R
(58) Field of Classification Search .............. 707/2, 707/4, 100, 103 Y; 705/7, 10, 35, 36 R; 715/503, 715/810
See application file for complete search history.

(56) References Cited

U.S. PATENT DOCUMENTS

| | | | |
|---|---|---|---|
| 6,768,995 B2 | 7/2004 | Thier et al. | |
| 7,130,822 B1 | 10/2006 | Their et al. | |
| 7,213,199 B2* | 5/2007 | Humenansky et al. | 715/209 |
| 7,328,206 B2* | 2/2008 | Petculescu et al. | 707/3 |
| 7,366,725 B2* | 4/2008 | Jordan et al. | 707/100 |
| 7,418,438 B2* | 8/2008 | Gould et al. | 701/1 |
| 2002/0107754 A1* | 8/2002 | Stone | 705/26 |
| 2003/0009649 A1* | 1/2003 | Martin et al. | 712/1 |

\* cited by examiner

Primary Examiner—Debbie M Le
(74) Attorney, Agent, or Firm—Shumaker + Sieffert, P.A.

(57) ABSTRACT

This disclosure describes techniques of validating data that a user enters into an enterprise system for storage within a multidimensional data cube. The data cube includes one or more data hyperplanes associated with members of a dimension having cells that contain data. In addition, the data cube includes a validation rule hyperplane of the dimension. Cells in the validation rule hyperplane contain data that indicate whether data in corresponding cells of the data hyperplanes comply with a validation rule. In accordance with these techniques, data in the cells of the data hyperplanes may be submitted if the data in the cells of the validation results hyperplane indicate that data contained in corresponding cells of the data hyperplanes complies with the validation rule.

39 Claims, 13 Drawing Sheets

MULTIDIMENSIONAL DATA CUBE VALIDATION

TECHNICAL FIELD

The invention relates to software systems and, in particular, to enterprise software systems.

BACKGROUND

Enterprise software systems are typically sophisticated, large-scale systems that support many, e.g., hundreds or thousands, of concurrent users. Examples of enterprise software systems include enterprise performance management systems, financial planning systems, budget planning systems, order management systems, inventory management systems, sales force management systems, business intelligence tools, enterprise reporting tools, project and resource management systems and other enterprise software systems.

Enterprise software systems may store enterprise data in data cubes. A data cube is a multi-dimensional data structure. Each of the dimensions of a data cube may represent a different type of enterprise data. For example, a first dimension of a data cube may contain customer data, a second dimension of the data cube may specify items purchased, a third dimension of the data cube may specify a price, a fourth dimension may represent business units within an enterprise, a fifth dimension may represent sales personnel, and so on. Thus, data in an individual cell of the data cube may indicate a particular price at which a particular customer purchased a particular item from a particular sales person associated with a particular business unit.

SUMMARY

In general, this disclosure describes techniques of validating data that a user enters into an enterprise system for storage within a multidimensional data cube. The data cube includes one or more data hyperplanes associated with a member of a first dimension having cells that contain data. In addition, the data cube includes a validation rule hyperplane associated with a member of the first dimension. Cells in the validation rule hyperplane contain data that indicate whether data in corresponding cells of the data hyperplanes comply with a validation rule. In accordance with these techniques, data in the cells of the data hyperplanes may be submitted if the data in the cells of the validation results hyperplane indicate that data contained in corresponding cells of the data hyperplanes complies with the validation rule.

As described herein, a data cube is associated with one or more validation expressions. Furthermore, the data cube may include a hyperplane for each of the validation expressions associated with the data cube. Each cell in a hyperplane associated with a validation expression may store a value that indicates whether data in corresponding cells specified by the validation expression satisfy the validation expression. If a cell in a hyperplane associated with one of the validation expressions stores a value that indicates that data in the corresponding cells does not satisfy the validation expression, a system implementing these techniques may prevent the user from permanently storing data in the corresponding cells into the data cube.

For example, a senior officer of an enterprise may determine that a junior officer of the enterprise may spend up to $10,000 on travel-related expenses. The senior officer may cause a data cube that stores enterprise data of the enterprise to be associated with a validation expression that evaluates to false if the junior officer attempts to budget more than $10,000 for travel-related expenses. Subsequently, the junior officer may attempt to enter data into the data cube that indicates that the junior officer plans to spend $5000 on accommodations, $3000 on transportation, and $4000 on meals and entertainment. In this example, a system that implements these techniques may insert the value of "false" into a cell of a hyperplane of the data cube that is associated with the validation rule. The system may insert the value of "false" because the total amount that the junior officer plans to spend for travel is greater than the $10,000 limit for travel imposed by the senior officer. When the junior officer attempts to submit this budget data, the system may detect that this cell has the value of "false." For this reason, the system may in prevent the junior officer from permanently entering this data into the data cube. Rather, the system may alert the junior officer that she must adjust her travel plans such that she will not spend more than $10,000.

In one embodiment, a method comprises storing a multidimensional data cube that includes one or more data hyperplanes associated with members of a first dimension of the data cube, wherein the data hyperplanes have cells that contain data. The multidimensional data cube also includes a validation hyperplane associated with a member of the first dimension of the data cube, wherein the validation hyperplane has cells that indicate whether data in corresponding cells of the data hyperplanes comply with a validation rule. The method also comprises submitting data contained in the cells of the data hyperplanes when data contained in one or more cells of the validation results hyperplane indicate that data contained in corresponding cells of the data hyperplanes complies with the validation rule.

In another embodiment, a device comprises a multidimensional data cube that includes one or more data hyperplanes associated with members of a first dimension of data cube, wherein the data hyperplanes have cells that contain data. The data cube also includes a validation hyperplane associated with a member of the first dimension of the data cube, wherein the validation hyperplane has cells that contain results that indicate whether data in corresponding cells of the data hyperplanes comply with a validation rule. The device also comprises a software system that causes the device to submit data contained in the cells of the data hyperplanes when data contained in one or more cells of the validation results hyperplane indicate that data contained in corresponding cells of the data hyperplanes complies with the validation rule.

In another embodiment, a computer-readable medium comprises instructions. When executed, the instructions cause a processor to store a multidimensional data cube that includes one or more data hyperplanes associated with members of a first dimension of the data cube, wherein the data hyperplanes have cells that contain data. The data cube also includes a validation hyperplane associated with a member of the first dimension of the data cube, wherein the validation hyperplane has cells that contain results that indicate whether data in corresponding cells of the data hyperplanes comply with a validation rule. The instructions also cause the processor to submit data contained in the cells of the data hyperplanes when data contained in one or more cells of the validation results hyperplane indicate that data contained in corresponding cells of the data hyperplanes complies with the validation rule.

The techniques described herein may provide one or more advantages. For example, the techniques may prevent users from submitting data that violates a policy of an enterprise. Moreover, the techniques may allow an administrator to create validation rules that only apply to particular users and to particular sets of data in a multidimensional data cube. As a result, less incorrect data may be submitted. Because less incorrect data may be submitted, a review of the data may be less time consuming.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
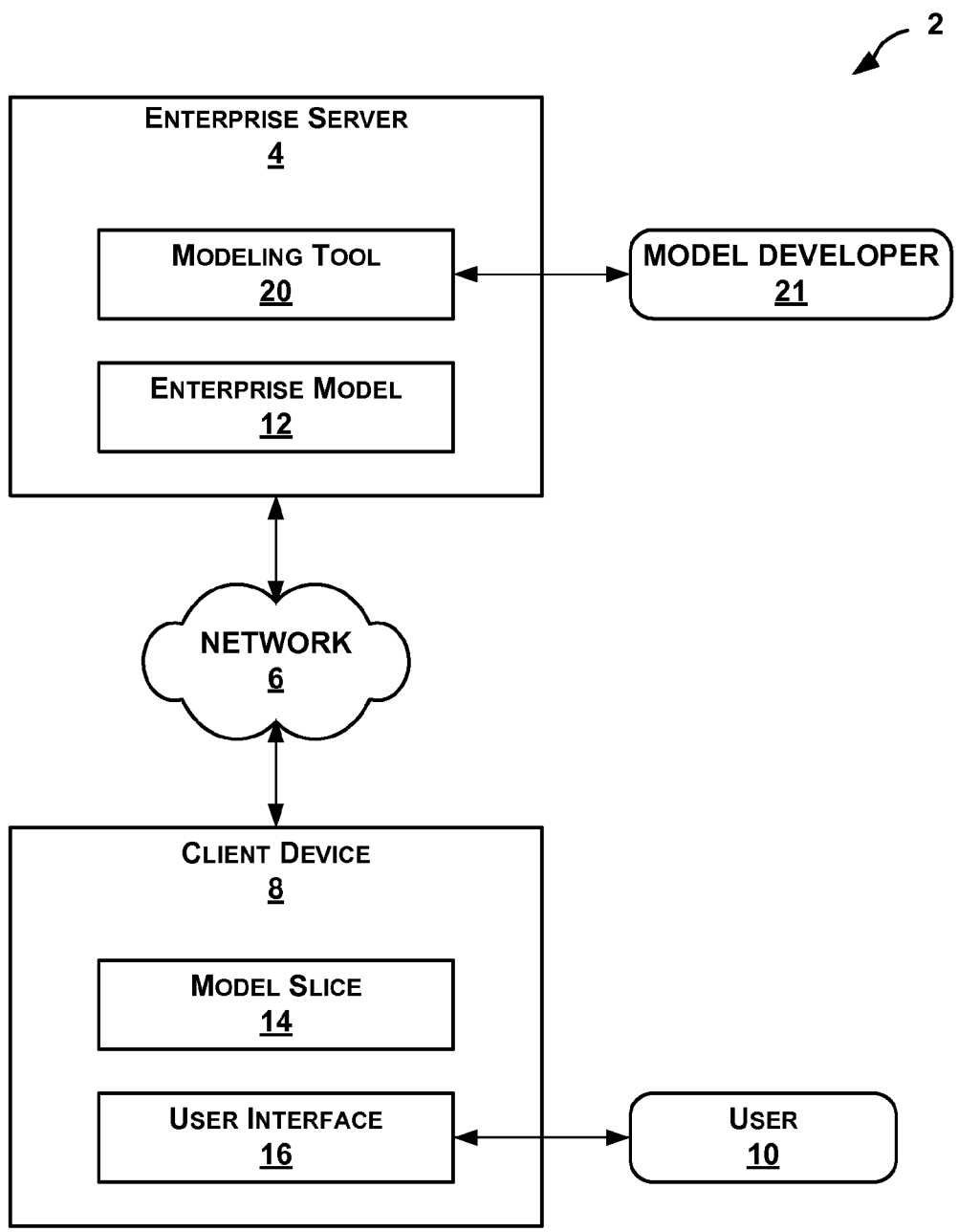
FIG. 1 is a block diagram illustrating an example enterprise software system.

FIG. 1 is a block diagram illustrating a simplified portion of an example enterprise software system 2. As illustrated in the example of FIG. 1, system 2 is shown to include a enterprise server 4, a network 6, and a client device 8.

Enterprise server 4 may be one or more computing devices that provide an operating environment of an enterprise software system. For instance, enterprise server 4 may comprise a standalone server, one or more blades in a server cluster, a personal computer, a mainframe computer, a supercomputer, or another type of electronic device.

Client device 8 may also be one or more electronic devices that provide a user with access to the enterprise software system provided by enterprise server 4. For instance, client device 8 may comprises a personal computer, a server, a personal digital assistant, a mobile telephone, a computing device integrated into a vehicle, a mainframe computer, a supercomputer, a television set-top box, a video game console, or another type of electronic device.

Network 6 facilitates communication between enterprise server 4 and client device 8. For example, network 6 may comprise a local-area network (LAN) such as an Ethernet or token-ring network. Furthermore, network 6 may also comprise a wide-area network such as the Internet. Communication links within network 6 may be wired or wireless. For instance, communications links within network 6 may comprise fiber optic cables, WiFi links, WiMax links, coaxial cable links, or other types of communications links.

Enterprise server 4 may provide a modeling tool 20 that allows a model developer 21 to interact with enterprise software system 2 and develop an enterprise model 12. Modeling tool 20 may provide a web-based interface, a graphical user interface, a command line interface, or another type of user interface. Moreover, modeling tool 20 is shown as executing on enterprise server 4 for ease of convenience, and may execute on a different server or devices associated with model developer 21.

Model developer 21 interacts with modeling tool 20 to create an enterprise model 12 that provides a definition for managing enterprise data and, optionally, for executing an enterprise-related task, such as executing an enterprise budget planning session, a forecasting session, an enterprise performance management session or other session. Model 12 may, for example, include data structures representing the organizational structure of all or portions of the enterprise. As one example, model developer 21, such as the chief financial officer, senior financial analysts and/or product and sales analysts, may define requirements and build financial models for the enterprise. The data structures of model 12 may specify and interrelate a set of hierarchically arranged nodes representing various business units or departments (e.g., cost or profit centers) within the organization. The data structures may further designate one or more individuals for each of the nodes. For example, model 12 may define, for each node, one or more individuals responsible for contributing enterprise data and reviewing enterprise data provided by individuals associated with lower-level nodes. These techniques are further described in U.S. Pat. No. 7,130,822 entitled "BUDGET PLANNING," and U.S. Pat. No. 6,768,995 entitled "REAL-TIME AGGREGATION OF DATA WITHIN AN ENTERPRISE PLANNING ENVIRONMENT," the entire contents of each being incorporated herein by reference.

In addition, model developer 21 may interact with modeling tool 20 to define one or more multi-dimensional datasets, referred to herein as "data cubes," that store multidimensional enterprise data for model 12. Different data cubes may be defined within model 12 to store enterprise data related to different enterprise activities. For example, a first data cube in model 12 may store enterprise data related to business travel expenses, a second data cube in model 12 may store enterprise data related to office supply expenses, and so on.

Further, model developer 21 may interact with modeling tool 20 directly or remotely to add a set of one or more "validation rules" to model 12. A "validation rule" may represent an enterprise's policy regarding enterprise data in the data cubes of model 12. For example, a validation rule may represent an enterprise's policy that a divisional manager cannot enter budget data into model 12 for a business trip without also providing a description of the purpose of the business trip. This policy may help ensure that divisional managers do not use company money for unnecessary travel.

Client device 8 presents a user interface 16 for receiving input from, and presenting output to, user 10. User interface 16 may be a command line interface, a graphical user interface, or another type of user interface. User 10 may utilize user interface 16 to interact with the enterprise data in model 12. User 10 may work with enterprise data in model 12 for a variety of purposes. For example, user 10 may be an employee of an enterprise. As part of the employment duties of user 10, the enterprise may require user 10 to submit budget planning data. For instance, the enterprise may require user 10 to submit budgets that specify how much money user 10 plans to spend on business travel during the next month.

As one example, when user 10 wishes to work with the enterprise data stored in model 12, user 10 may utilize user interface 16 to instruct client device 8 to participate in an enterprise planning session. When user 10 instructs client device 8 to participate in an enterprise planning session, client device 8 may download some or all of model 12 to client device 8. This downloaded portion of model 12 may be referred to herein as a "slice", shown as "model slice 14" on client device 8. For example, enterprise server may "cut-down" enterprise model 12 to produce a respective "slice" for user 10. During this process, enterprise server 4 identifies areas of the defined models to which user 10 is assigned, either as a contributor or a reviewer. Enterprise server 4 may, for example, present the respective slice to user 10 in the form of model slice 14 to capture contribution data, and to reconcile the contribution data with organizational targets. In this fashion, enterprise planning system 2 need not communicate the entire model 12 to each of the users, thereby reducing communication time as well as resource requirements. Instead, each user receives only relevant information.

Moreover, when client device 8 downloads the portion of model 12 as model slice 14, client device 8 may also download validation rules of model 12 that are relevant in model slice 14. After client device 8 downloads model slice 14, user 10 may utilize user interface 16 to view the enterprise data in model slice 14. In addition, user 10 may utilize user interface 16 to enter new enterprise data into model slice 14. For example, user 10 may add enterprise data regarding business travel to model slice 14. When user 10 enters new enterprise data into model slice 14, client device 8 may determine whether the new enterprise data complies with the validation rules in model slice 14. The validation rules may ensure that the new enterprise data is consistent with guidelines established by the enterprise. For example, a validation rule may state that expenditures for business travel during the month of January cannot exceed $10,000. If user 10 enters budget data for a business trip during January that exceeds $10,000, user 10 has breached (i.e., has not complied with) this validation rule. Because user 10 has breached this validation rule, client device 8 may alert user 10 that the budget data that user 10 has entered is in breach of the validation rule and may invite user 10 to enter new budget data that complies with the validation rule.

When user 10 finishes interacting with the enterprise data in model slice 14, user 10 may utilize user interface 16 to instruct client device 8 to upload any new enterprise data entered by user 10 to enterprise server 4. When enterprise server 4 receives the new enterprise data, enterprise server 4 may subsequently integrate the new enterprise data into model 12. For example, enterprise server 4 may alert another user defined within the model that user 10 has submitted new enterprise data that is ready for review. This user may then review the new enterprise data, ultimately accepting or rejecting the data. If the reviewer approves the new enterprise data, enterprise server 4 may integrate the new enterprise data into model 12 by aggregating the new data with other data stored within the multidimensional data structures of model 12. Otherwise, if the reviewer does not approve the new enterprise data, enterprise server 4 does not integrate the new enterprise data into model 12. In this case, enterprise server 4 may alert user 10 that the reviewer has rejected the new enterprise data.

The techniques described in this disclosure may provide several advantages. For example, proper use of validation rules may enable upper-level reviewers of an enterprise (e.g., financial officers or controllers) to force subordinate managers within the enterprise to comply with policies established by the upper-level reviewers. For instance, validation rules may prevent a subordinate manager from budgeting excessive amounts of enterprise money for various business functions. In addition, another validation rule may prevent a subordinate manager from submitting incomplete information regarding a business function. Using validation rules in this manner may save time for the senior officers because the validation rules assure the senior officers that the subordinate managers cannot submit enterprise data that does not conform to policies established by the enterprise. Furthermore, using validation rules in this manner may reduce the occurrence of mistakes by alerting a user when entered data is not within expected limited.

Figure 2:
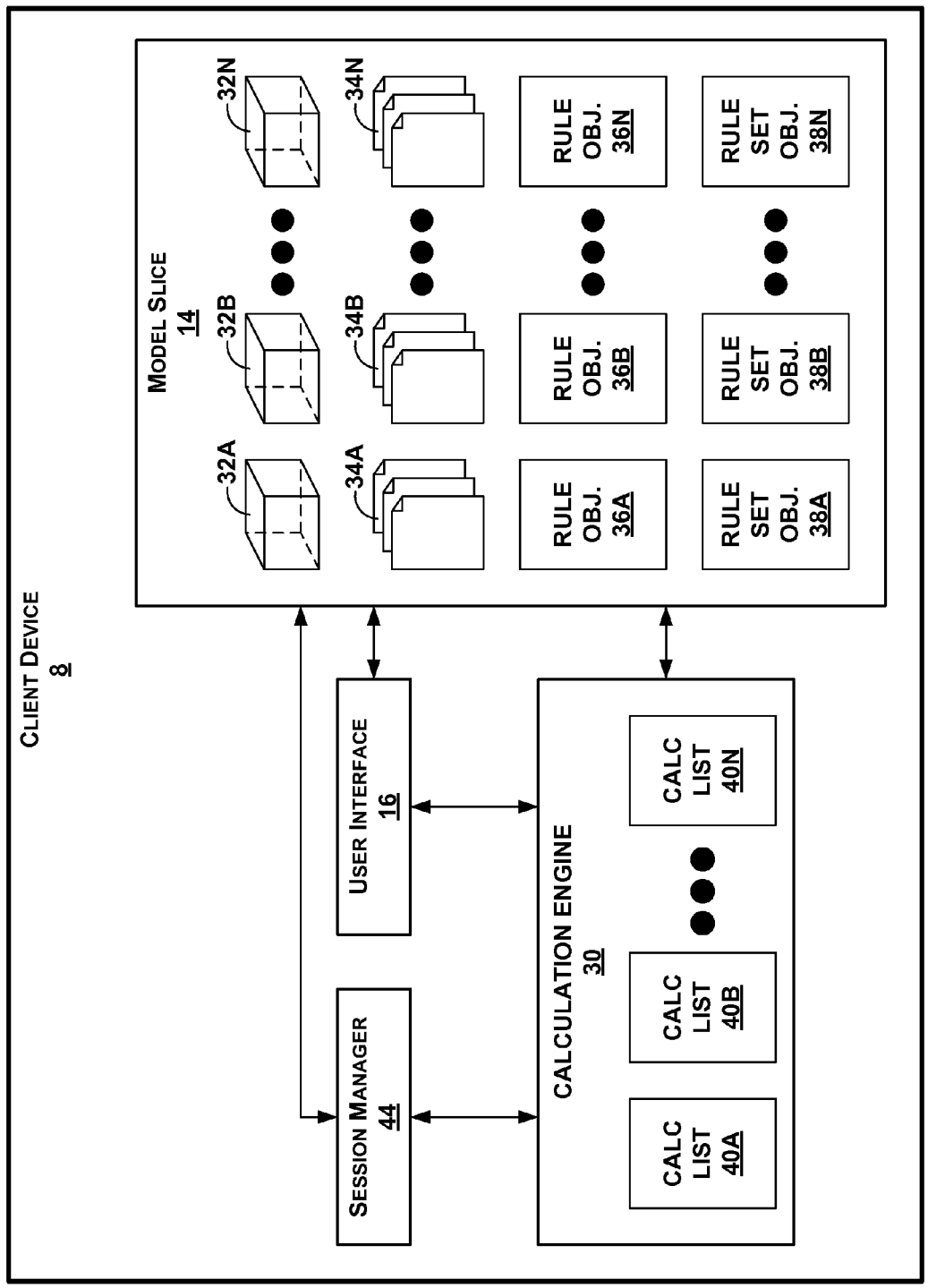
FIG. 2 is a block diagram illustrating example details of a client device in the enterprise software system.

FIG. 2 is a block diagram illustrating exemplary details of client device 8. As illustrated in the example of FIG. 2, client device 8 may download model slice 14, user interface 16, a calculation engine 30, and a session manager 44.

User 10 may interact with user interface 16 to initiate an enterprise planning session. When user 10 interacts with user interface 16 to initiate an enterprise planning session, user interface 16 may send a request to session manager 44 to start the enterprise planning session. In response to this request, session manager 44 may request model slice 14 from enterprise server 4. Upon receiving model slice 14 from enterprise server 4, session manager 44 may request that calculation engine 30 perform any necessary calculations to complete the data in model slice 14.

Model slice 14 may store data cubes 32A through 32N (collectively, "data cubes 32"), index list sets 34A through 34N (collectively, "index list sets 34"), rule objects 36A through 36N (collectively, "rule objects 36"), and rule set objects 38A through 38N (collectively, "rule set objects 38"). Each of data cubes 32, index lists 34, rule objects 36, rule set objects 38 plus other data cubes, index lists, rule objects, and rule set objects may also be included in model 12. Moreover, the data cubes and index lists in model 12 may contain more data than data cubes 32 and index lists 34. In other words, model slice 14 may be a subset of model 12.

Each of data cubes 32 in model slice 14 may comprise a multi-dimensional dataset that stores a different type of enterprise data. For example, data cube 32A may store enterprise data that relates to marketing expenses, data cube 32B may store enterprise data that relates to office supply expenses, data cube 32C may store enterprise data that relates to travel expenses, and so on.

Each index list in index list sets 34 may specify "index items" of a different dimension of data cubes 32. An "index item" is a label associated with a "hyperplane" of data in a particular dimension. For example, data cube 32C may store enterprise data that relates to travel expenses. In this example, data cube 32C may include a "Travel costs" dimension, a "Divisions" dimension, and a "Months" dimension. A single cell in data cube 32C may store a value that represents an amount of money spent for a particular type of travel cost by a particular division of an enterprise during particular month. In this example, index list set 34C may be associated with data cube 32C. A first index list in index list set 34C may specify index items for the "travel costs" dimension. The index items in this first index list may specify particular types of travel costs. For instance, index items specified by the first index list may include "number of nights," "cost of hotel per night," "cost of meals per night," "vehicle rental cost," and other types of travel costs.

Cells in data cubes 32 may be divided into hyperplanes. For purposes of this disclosure, a hyperplane is a set of all cells in a data cube that are associated with one index value (i.e., member) of a dimension. Otherwise stated, a "hyperplane" is a set of cells that extends in (n−1) dimensions of an n-dimensional space. A single cell is in exactly one hyperplane associated with a single index value of each dimension of a data cube. For this reason, a single cell in a data cube may be uniquely identified by specifying a hyperplane in each dimension of the data cube. Because each hyperplane is associated with an index value of a dimension, a single cell in a data cube may also be identified by specifying an index value in each of the dimensions of the data cube. For this reason, this disclosure may refer to an individual cell using the following notation: $C_{X, Y, Z, \ldots}$, where the subscript letters represent index values in different dimensions.

The following examples may aid the reader to understand what is meant by the term "hyperplane." In one example, consider a two-dimensional grid, like an Excel spreadsheet. In this example, each row of the spreadsheet grid is a hyperplane because cells in a row extend along the horizontal dimension, but not along the vertical dimension. Similarly, each column of the spreadsheet grid is a hyperplane because cells in a column extend along the vertical dimension, but not along the horizontal dimension. Each cell in the spreadsheet grid may be identified by specifying a name of a column in the spreadsheet grid and a name of a row in the spreadsheet grid. In a second example, consider a three-dimensional grid, like a Rubik's Cube. A first layer of blocks that lies against the ground is one hyperplane, a second layer of block that lies on top of the first layer of blocks is another hyperplane, and so on. Furthermore, a first vertical stack of blocks on a front surface of the cube is a hyperplane, a second vertical stack of blocks that lies behind the first vertical stack of blocks is another hyperplane, and so on. In addition, a first vertical stack of blocks along a side surface of the cube is a hyperplane, and a second vertical surface next to the first stack of blocks along the side surface is another hyperplane, and so on. A block in the cube may be identified by specifying a horizontal layer, a vertical layer from the front surface of the cube, and a vertical layer from a side surface of the cube. The same principle is applicable to data cubes that have an arbitrary number of dimensions.

Continuing the travel expenses example, the travel expenses data cube may include a first hyperplane of the "travel costs" dimension to store data regarding the "number of nights", a second hyperplane of the "travel costs" dimension to store data regarding the "cost of hotel per night", a third hyperplane of the "travel costs" dimension to store data regarding the "cost of meals per night," a fourth hyperplane of the "travel costs" dimension to store data regarding the "vehicle rental cost," and additional hyperplanes of the "travel costs" dimension for other types of travel costs. Similarly, the travel expenses data cube may include a first hyperplane in the "month" dimension to store data that relates to the "January" index item, a second hyperplane in the "month" dimension to store data that relates to the "February" index item, and so on. The travel expenses data cube may also include a first hyperplane in the "divisions" dimension to store data that relates to the "Americas" index item, a second hyperplane in the "divisions" dimension to store data that relates the to "Asia Pacific" index item, and so on.

Cells in data cubes 32 may be "detail" cells or "aggregate" cells. "Detail" cells contain data that is not dependent on data in other cells. "Aggregate" cells contain data that is dependent on data in other cells. In other words, data in aggregate cells is calculated based on values in other cells. When client device 8 downloads model slice 14 from enterprise server 4, calculation engine 30 may calculate data in aggregate cells of data cubes 32. In order to calculate the data in aggregate cells of data cubes 32, calculation engine 30 may calculate values of cells of a hyperplane in a dimension of a data cube from other data in corresponding cells of other hyperplanes in the same dimension of the data cube. As used in this disclosure, a first cell in a first hyperplane of a first dimension of a data cube "corresponds" to a second cell in a second hyperplane of the first dimension of the data cube when, for every other dimension in the data cube, the first cell and the second cell are in the same hyperplanes. Continuing the travel expenses example, the travel expenses data cube may include a hyperplane in the "travel costs" dimension to store data associated with an "accommodations" index item. Calculation engine 30 may calculate data to be stored in cell A of the "accommodations" hyperplane by multiplying a value in a cell B in the "number of nights" hyperplane of the "travel costs" dimension by a value in a cell C in the "cost of hotel per night" hyperplane of the "travel costs" dimension. Cells A, B, and C correspond to one another. In other words, cells A, B, and C are in the same hyperplane of the "month" dimension and the same hyperplane of the "division dimension." For instance, cells A, B, and C may all be in the "April" hyperplane of the "months" dimension and the "Americas" hyperplane of the "divisions" dimension. Calculation engine 30 may perform an equivalent calculation for each cell in the "accommodations" hyperplane. In this way, calculation engine 30 may store a value in each of the cells in the "accommodations" hyperplane.

To further illustrate the calculation of values in a hyperplane, consider the following example. Suppose that a manager of the "Americas" division plans five nights of travel in the month of April and estimates that the cost of a hotel per night is $200. In this example, the value "5" may be stored in the cell $C_{April, Americas, Number\ of\ Nights}$. Similarly, the value "$200" is stored in a cell $C_{April, Americas, Cost\ of\ Hotel\ per\ Night}$. In this example, calculation engine 30 may insert the value "$1000" (i.e., 5*$200) into a cell $C_{April, Americas, Accommodations}$.

Each of data cubes 32 may include references to one or more of rule objects 36. Each of rule objects 36 may comprise a data structure that specifies a name of the rule, a particular data cube, a particular dimension of this data cube, a validation expression that specifies one or more index items of the specified dimension of the specified data cube. This disclosure refers to the dimension specified by a rule object as the "expression dimension" of the rule object. A validation expression is an expression that evaluates to "true" only when data in cells identified by specified index items comply with certain conditions. If the data in the cells identified by the specified index items do not comply with the conditions, the validation expression may evaluate to "false." This disclosure refers to hyperplanes of the expression dimension that are associated with the index items specified in the validation expression as "operand hyperplanes." In addition, a rule object may specify one or more index items in each dimension of the specified data cube other than the specified dimension. Hyperplanes associated with the specified index items are referred to herein as "scoping hyperplanes." As described in detail below, the scoping hyperplanes may be used to specify the scope of the rule object.

Each of data cubes 32 may include one "expression results" hyperplane per rule object to which the data cube contains a reference. "Expression results" hyperplanes may be associated with index values that are equal to the names specified by the rule objects. Continuing the travel expenses example, the "travel costs" data cube may refer to rule object 36A. In this example, rule object 36A may specify the name "Hotel and Vehicle Rule" and may specify the "travel cost" dimension of the "Travel costs" data cube as the expression dimension. In this example, the "Travel Costs" data cube may include an additional hyperplane in the "travel costs" dimension. This additional hyperplane in the "travel costs" dimension may be associated with the index item "Hotel and Vehicle Rule."

Calculation engine 30 may calculate values for cells in an "expression results" hyperplane that are also in the scoping hyperplanes. When calculation engine 30 calculates values for cells in an "expression results" hyperplane, calculation engine 30 may store Boolean (i.e., true or false) values in the cells. The Boolean value for a cell in the "expression results" hyperplane indicates whether a validation expression of a rule object holds for data in corresponding cells of the operand hyperplanes. In other words, a cell in the validation results hyperplane of a validation rule indicates whether data in corresponding cells of the operand hyperplanes specified by the validation satisfies the validation rule. Continuing the example from the previous paragraph, rule object 36A may specify the "April" hyperplane in the "month" dimension and the "Americas" dimension in the "division" dimension as scoping hyperplanes. Furthermore, rule object 36A may specify a validation expression that evaluates to "true" when the sum of data in a cell of the "accommodations" hyperplane in the "travel cost" dimension and data in a corresponding cell in the "vehicle rental costs" hyperplane in the "travel cost" dimension is less than $10,000. In this example, calculation engine 30 may evaluate the validation expression of the cell $C_{April, Americas, Hotel\ and\ Vehicle\ Rule}$. Calculation engine 30 does not evaluate the validation expression for any other cells in the validation results hyperplane because $C_{April, Americas, Hotel\ and\ Vehicle\ Rule}$ is the only cell in the validation results hyperplane that is also in the scoping hyperplanes. For instance, suppose that cell $C_{April, Americas, Accommodations}$ stores the value $5000 and that cell $C_{April, Americas, Vehicle\ Rental\ Costs}$ stores the value $800. In this case, calculation engine 30 may store the value of "true" in cell $C_{April, Americas, Hotel\ and\ Vehicle\ Rule}$ because $5000+$800 is less than $10,000.

Each of index list sets 34 may include a so-called "e-list." Index items in the "e-list" specify nodes (e.g., cost centers or other entities within an enterprise). Nodes in the "e-list" may be associated with users or groups of users. For example, index items in the "e-list" may specify a "Chicago" cost center, a "London" cost center, and a "Johannesburg" cost center. Each of these cost centers may be associated with users or groups of user such as "George," "Lisa," "Board Members," "divisional managers," and other individual users or groups of users. Each of data cubes 32 may include an "e-list" dimension having the index items specified in the "e-list." A user may be restricted from accessing data that is not in a hyperplane of the "e-list" dimension associated with a node associated with the user. Continuing the previous example, "George" may be associated with the "Chicago" node of the "e-list" dimension, but "Lisa" is not associated with the "Chicago" node of the "e-list" dimension. In this example, data in the "Chicago" hyperplane of the "e-list" dimension of the travel expense data cube may be accessed by "George", but may not be accessed by "Lisa."

Each of rule set objects 38 may be a data structure that specifies one or more of rule objects 36. Before client device 8 downloads rule set objects 38, administrator 20 may map equivalent rule set objects in model 12 to one or more index items in the "e-list." When client device 8 downloads these rule set objects as rule set objects 38, rule set objects 38 may continue to indicate that they are mapped to the index items in the "e-list." Furthermore, each of rule set objects 38 specifies a failure action. The failure action of a "rule set object" specifies an action to be performed by session manager 44 when a validation expression specified by one of the rule objects specified by the rule set object evaluates to false. For example, the failure action may instruct session manager 44 to generate a message that alerts user 10 that enterprise data entered by user 10 breaches a validation rule specified by the rule set object and may instruct session manager 44 to submit the updated data to enterprise server 4 regardless. Alternatively, the failure action may instruct session manager 44 to generate a message that alerts user 10 that enterprise data entered by user 10 breaches a validation rule specified by the rule set object and may instruct session manager 44 not to submit the new enterprise data to enterprise server 4 regardless, but to allow user 10 to save the new enterprise data on client device 8. In still another alternative, the failure action may instruct session manager 44 to generate a message that alerts user 10 that new enterprise data entered by user 10 breaches a validation rule specified by the rule set object, may instruct session manager 44 not to submit the new data to enterprise server 4, and may prevent user 10 from saving the new updated enterprise data on client device 8.

Continuing the travel expenses example, rule set object 38A may specify rule object 36A and may be mapped to the "Americas" division or other index item of the e-list. In addition, rule set object 38A specifies a first failure action. The first failure action may specify that no enterprise data may be submitted when a validation expression of rule object 36A evaluates to false. In this example, if a user associated with the "Americas" division, e.g., a manager "George," enters new enterprise data into model slice 14 that results in a value of "false" being stored in a cell of the "Hotel and Vehicle Rule" hyperplane of the "travel costs" dimension, the first failure action may be performed and "George" may be prevented from submitting the new enterprise data to model 12 in enterprise server 4. In this example, the mapping specified by rule set object 38A does not map the first rule object to a different node (e.g., "Europe"). Therefore, if a user associated with the node "Europe" enters new data in model slice 14 that results in a value of "false" being stored in a cell of the "Hotel and Vehicle Rule" hyperplane of the "travel costs" dimension, the first failure action is not performed. This makes sense because the rule is only associated with the "Americas" node and not the "Europe" node in this example.

Calculation engine 30 may use calculation lists 40A through 40N (collectively, "calculation lists 40") to calculate values. For example, calculation engine 30 may include one of calculation lists 40 for each of data cubes 32. When client device 8 downloads model slice 14 from enterprise server 4, calculation engine 30 may add calculation items for each of data cubes 32 to respective ones of calculation lists 40. Each calculation item in a calculation list associated with one of data cubes 32 may represent a calculation to be performed in order to calculate data of a hyperplane of the data cube. Thus, each one of calculation lists 40 represents a sequence of calculations that, when performed, causes calculation engine 30 to recalculate all calculated data in an associated one of data cubes 32. Continuing the travel expenses example, the values in cells in the "accommodations" hyperplane of the "travel costs" dimension of the travel data cube are equal to the product of values in corresponding cells in the "number of nights" hyperplane of the "travel costs" dimension and values in corresponding cells in the "cost of hotel per night" hyperplane of the "travel costs" dimension. In this example, when client device 8 downloads model slice 14, calculation engine 30 may insert into calculation list 40A a single calculation item for the "accommodations" hyperplane that calculates data in the "accommodations" hyperplane.

For instance, suppose that there are twelve index items in the "Months" dimension (one for each month of a year) and that there are five index items in the "Divisions" dimension (one for each division of the enterprise), and eight index items in the "Travel costs" dimension (one for each type of travel cost, including "accommodations"). Given these index items, there are sixty cells (12*5) in the "accommodations" hyperplane. However, calculation engine 30 may insert a single calculation item into calculation list 40A. This single calculation item causes calculating engine 30 to compute the values for the "accommodations" hyperplane. For example, a first calculation item may cause calculation engine 30 to extract a first set of values from every cell $C_{X, Y, Number\ of\ Nights}$, where X is an index value in the "Months" dimension and Y is an index value in the "Divisions" dimension. The first calculation item may also instruct calculation engine 30 to extract a second set of values from every cell $C_{X, Y, Cost\ of\ Hotel\ per\ Night}$, where X is an index value in the "Months" dimension and Y is an index value in the "Divisions" dimension. Calculation engine 30 may then multiply values in the first set of values with corresponding values in the second set of value and store the resulting products in corresponding cells $C_{X, Y, Accommodations}$. This first calculation item may be more compactly represented as the Reverse Polish Notation expression:

$$C_{X, Y, Accommodations} =$$

$$C_{X, Y, Number\ of\ Nights}, C_{X, Y, Cost\ of\ Hotel\ per\ Night}, ``*".$$

for each value of X and Y, where X is an index value of the "Months" dimension and Y is an index value of the "Division" dimension.

In addition to normal calculations, calculation engine 30 may also insert calculation items into calculation lists 40 to evaluate validation expressions of respective ones of data cubes 32, i.e. apply the validation rules. When calculation engine 30 processes a calculation item for a validation rule of a data cube, calculation engine 30 may store the resulting Boolean values in appropriate cells of a hyperplane of the validation rule of the data cube. Continuing the travel expenses example, rule object 36A specifies the "Hotel and Vehicle Rule." According to this rule, the sum of data in a cell of the "accommodations" hyperplane and data in a corresponding cell in the "vehicle rental costs" hyperplane may not exceed $10,000. In this example, there are sixty cells in the "Hotel and Vehicle Rule" hyperplane of the "travel costs" dimension. However, calculation engine 30 may insert a single calculation item into calculation list 40A that, when performed by calculation engine 30, causes calculation engine 30 to compute the values for the "Hotel and Vehicle Rule" hyperplane of the expression dimension. For example, a calculation item for the "Hotel and Vehicle Rule" hyperplane may be represented in reverse Polish notation as:

$$C_{X, Y, Hotel\ and\ Vehicle\ Rule} =$$

$$C_{X, Y, Accommodations}, C_{X, Y, Cost\ of\ Vehicle}, ``+", ``10,000", ``>".$$

for each value of X and Y, where X is an index value of the "Months" dimension and Y is an index value of the "Divisions" dimension.

When user 10 is finished working with the enterprise data in model slice 14, user 10 may send a request to session manager 44 to close an enterprise planning session. When session manager 44 receives this request from user 10, session manager 44 requests calculation engine 30 to recalculate values in data cubes 32. In addition, user 10 may send a request to calculation engine 30 to recalculate the values in data cubes 32 without requesting to close a current enterprise planning session. When calculation engine 30 receives a request to recalculate values in data cubes 32, calculation engine 30 may perform the calculation items in ones of calculation lists 40 that are associated with ones of data cubes 32 that include values that have been updated. For example, user 10 may have updated the value stored in $C_{January, Americas, Number\ of\ Nights}$ of the travel expenses data cube in order to budget for a lengthier business trip. In this example, calculation engine 30 may detect that a value stored in a cell of the travel expenses data cube has changed. When calculation engine 30 detects that a value in a cell of a data cube has changed, calculation 30 may perform every calculation items in the one of calculation lists 40 associated with the travel expenses data cube. In this way, calculation engine 30 may recalculate all of the values in the travel expenses data cube.

After calculation engine 30 recalculates values in data cubes 32, calculation engine 32 may determine whether any "pertinent" cells in validation results hyperplanes in data cubes 32 contains values of "false." As used in this disclosure, a cell in a validation results hyperplane is "pertinent" when the cell is, for each dimension of the data cube other than the expression dimension specified by the validation rule associated with the validation results hyperplane, within a scoping hyperplane specified by the validation rule for the dimension. For each pertinent cell that contains a value of "false", calculation engine 30 may identify one of rule set objects 38 that specifies a validation rule associated with a validation results hyperplane that contains the pertinent cell. Calculation engine 30 may then determine whether the identified ones of rule set objects 38 are mapped to an e-list index item associated with user 10. Calculation engine 30 may then generate a list that includes a reference to each identified one of rule set objects 38 that is mapped to an e-list index item associated with user 10. In this way, calculation engine 30 generates a list of failed validation rules. In addition, calculation engine 30 may identify one of the rule set objects on the list that specifies a most severe failure action. Calculation engine 30 may then provide the list of failed validation rules and a reference to the most severe failure action to session manager 44.

If this list of failed validation rules is empty session manager 44 may transmit the updated enterprise data in model slice 14 to enterprise server 4. Otherwise, if the list of failed validation rules is not empty, session manager 44 may present the list of failed validation rules to user 10 and perform the most severe failure action.

Figure 3:
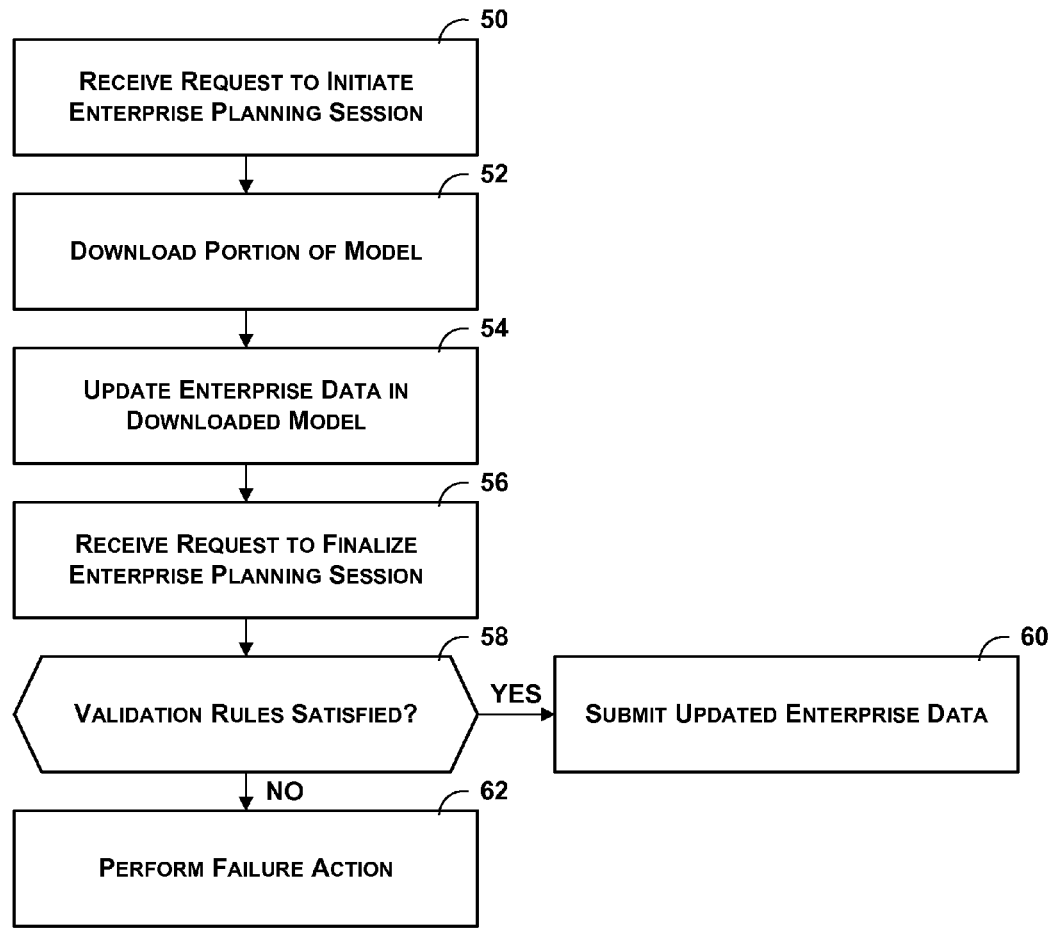
FIG. 3 is a flowchart illustrating an exemplary operation of the client device.

FIG. 3 is a flowchart illustrating an exemplary operation of client device 8. Initially, client device 8 may receive a request from user 10 to initiate an enterprise planning session (50). When client device 8 receives this request, client device 8 may download at least a portion of model 12 from enterprise server 4 (52). After client device 8 receives the portion of model 12 (i.e., model slice 14), client device 8 may update model slice 14 in accordance with instructions received from user 10 via user interface 16 (54). At some later point in time, client device 8 may receive a request from user 10 to finalize the enterprise planning session (56).

When client device 8 receives a request from user 10 to finalize the enterprise planning session, client device 8 may determine whether the data in model 12 satisfies validation rules associated with data cubes of model slice 14 to which user 10 must comply (58). If each of the validation rules are satisfied ("YES" of 58), client device 8 may submit enterprise data in model slice 14 to enterprise server 4 (60). Otherwise, if one or more of the validation rules is not satisfied ("NO" of 58), client device 8 may perform a failure action (62). For example, client device 8 may generate a warning message and refuse to submit data to enterprise server 4.

Figures 4A, 4B:
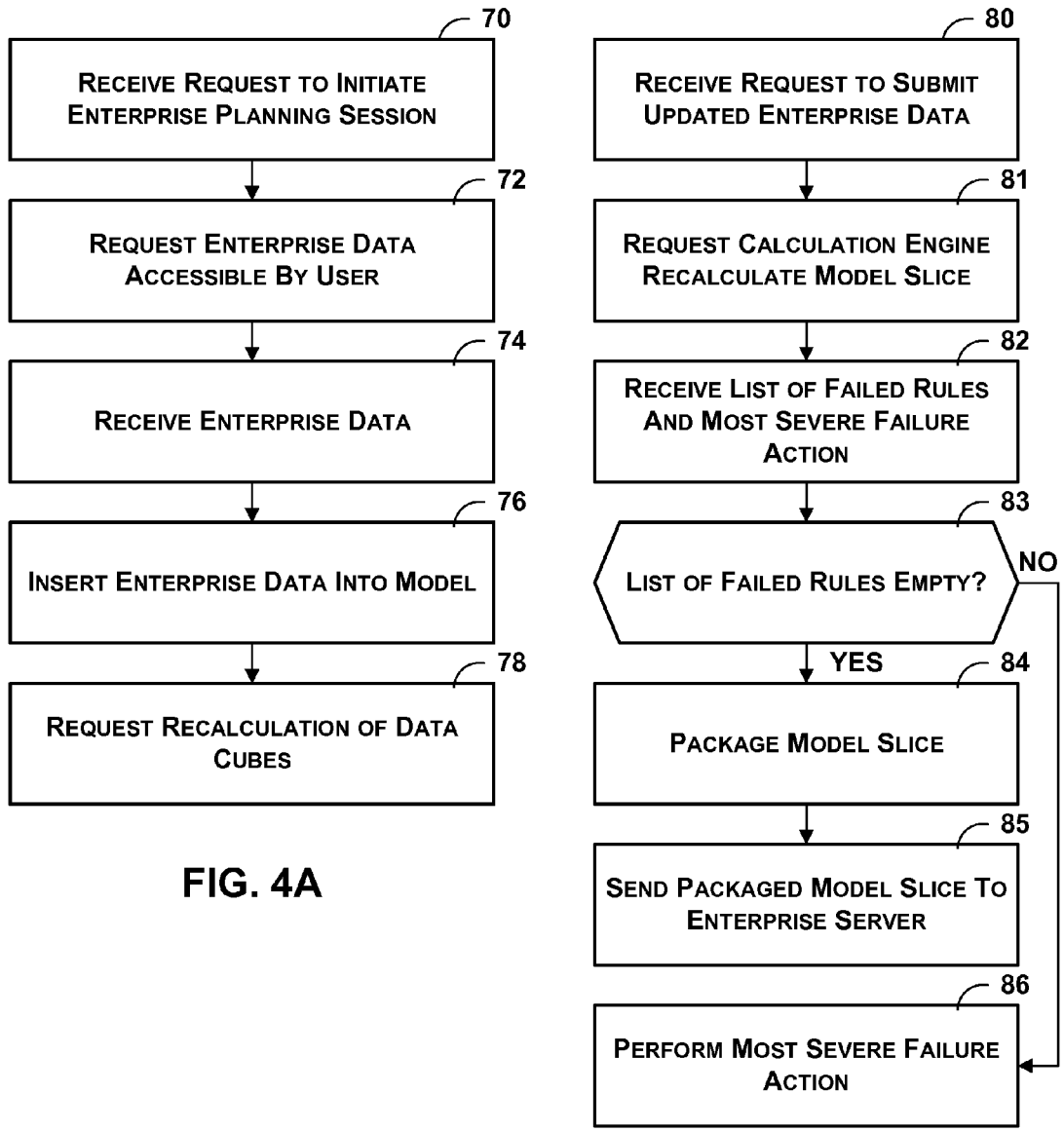
FIG. 4A is a flowchart illustrating an exemplary operation of a session manager of the client device to start an enterprise planning session.
FIG. 4B is a flowchart illustrating an exemplary operation of the session manager to end an enterprise planning session.

FIG. 4A is a flowchart illustrating an exemplary operation of session manager 44 to start an enterprise planning session. Initially, session manager 44 may receive a request from user 10 to initiate an enterprise planning session (70). In response to this request, session manager 44 may send a request to enterprise server 4 for data in model 12 that is accessible by user 10 (72). When enterprise server 4 receives the request, enterprise server 4 may calculate values as necessary. Session manager 44 may then receive the requested data from enterprise server 4 (74) and store this data as model slice 14 (76). Session manager 44 may then request that calculation engine 30 recalculate values in model slice 14 (78).

FIG. 4B is a flowchart illustrating an exemplary operation of session manager 44 to end an enterprise planning session. Initially, session manager 44 may receive a request from user 10 to end an enterprise planning session (80). In response to this request, session manager 44 may send a request to calculation engine 30 to recalculate values in model slice 14, as necessary (81). When calculation engine 30 finishes recalculating the values in model slice 14, session manager 44 may receive from calculation engine 30 a list of failed validation rules and a reference to a most severe failure action (82). Session manager 44 may then determine whether the list of failed validation rules is empty (83).

If the list of failed validation rules is empty ("YES" of 83), session manager 44 may package model slice 14 (84). Session manager 44 may package model slice 14 by performing one or more lossless compression techniques on model slice 14. After packaging model slice 14, session manager 44 may send the packaged version of model slice 14 to enterprise server 4 (85).

On the other hand, if the list of failed validation rules is not empty ("NO" of 83), session manager 44 may perform the most severe failure action (86). Performing the most severe failure action may or may not prevent session manager 44 from packaging and sending model slice 14 to enterprise server 4. For example, if the most severe failure action is merely a warning to the user, session manager 44 may package model slice 14 and send the packaged version of model slice 14 to enterprise server 4.

Figure 5:
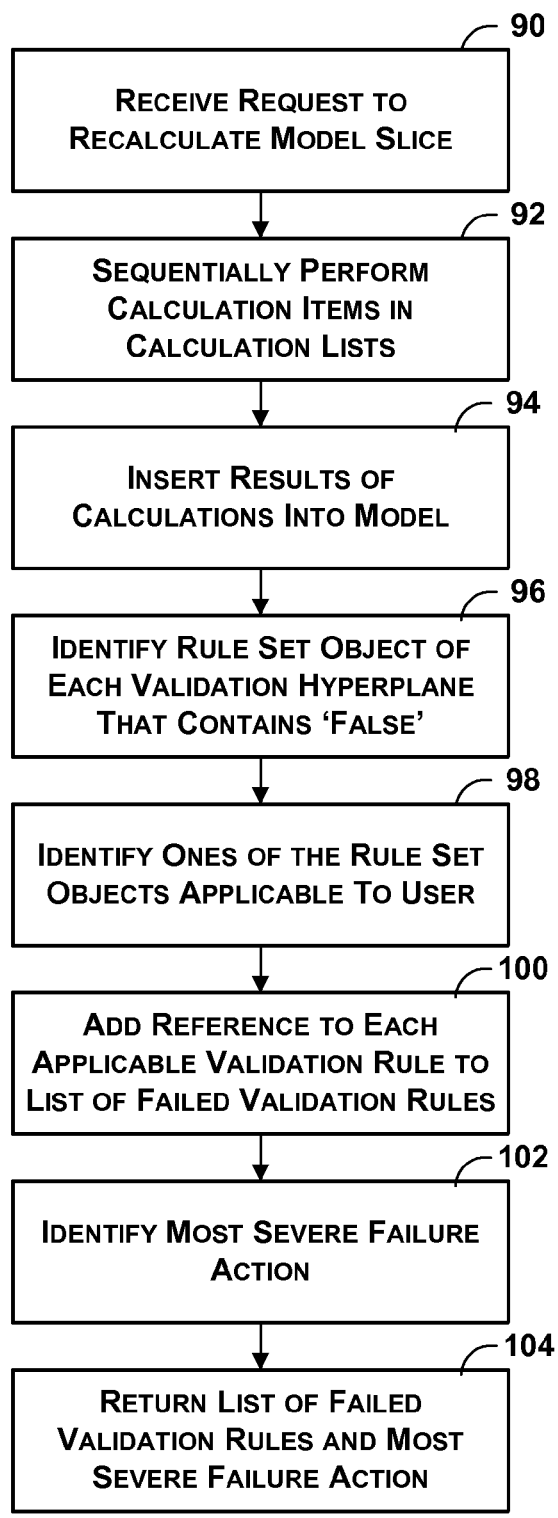
FIG. 5 is a flowchart illustrating an exemplary operation of a calculation engine in the client device when the calculation engine receives a request to recalculate data in a model slice.

FIG. 5 is a flowchart illustrating an exemplary operation of calculation engine 30 when calculation engine 30 receives a request to recalculate data in model slice 14. Initially, calculation engine 30 may receive a request to recalculate data in model slice 14 (90). In response to this request, calculation engine 30 may sequentially perform each calculation item in the ones of calculation lists 40 that are associated with ones of data cubes 32 that include cells that specify updated data (92). Next, calculation engine 30 may then insert results generated by the calculation items into appropriate cells of the data cubes associated with the calculation lists (94).

When user 10 decides to submit the data in data cubes 32 to enterprise server 4, calculation engine 30 identifies a rule set object associated with each validation hyperplane in data cubes 32 that contains a pertinent cell that stores that value "false" (96). Once calculation engine 30 has identified these rule set objects, calculation engine 30 may identify which ones of the identified rule set objects are applicable to user 10 (98). In other words, calculation engine 30 may identify which ones of the identified rule set objects are mapped to e-list index items that are associated with user 10. In this way, calculation engine 30 determines which failed validation rules are applicable to user 10. Next, calculation engine 30 may add a reference to each failed validation rule that is applicable to user 10 to a list of failed validation rules (100). In addition, calculation engine 30 may identify the most severe failure action associated with a validation rule in the list of failed validation rules that are applicable to user 10 (102). After identifying the most severe failure action, calculation engine 30 may return to session manager 44 the list of failed validation rules that are applicable to user 10 and a reference to the most severe failure action (104).

Figure 6:
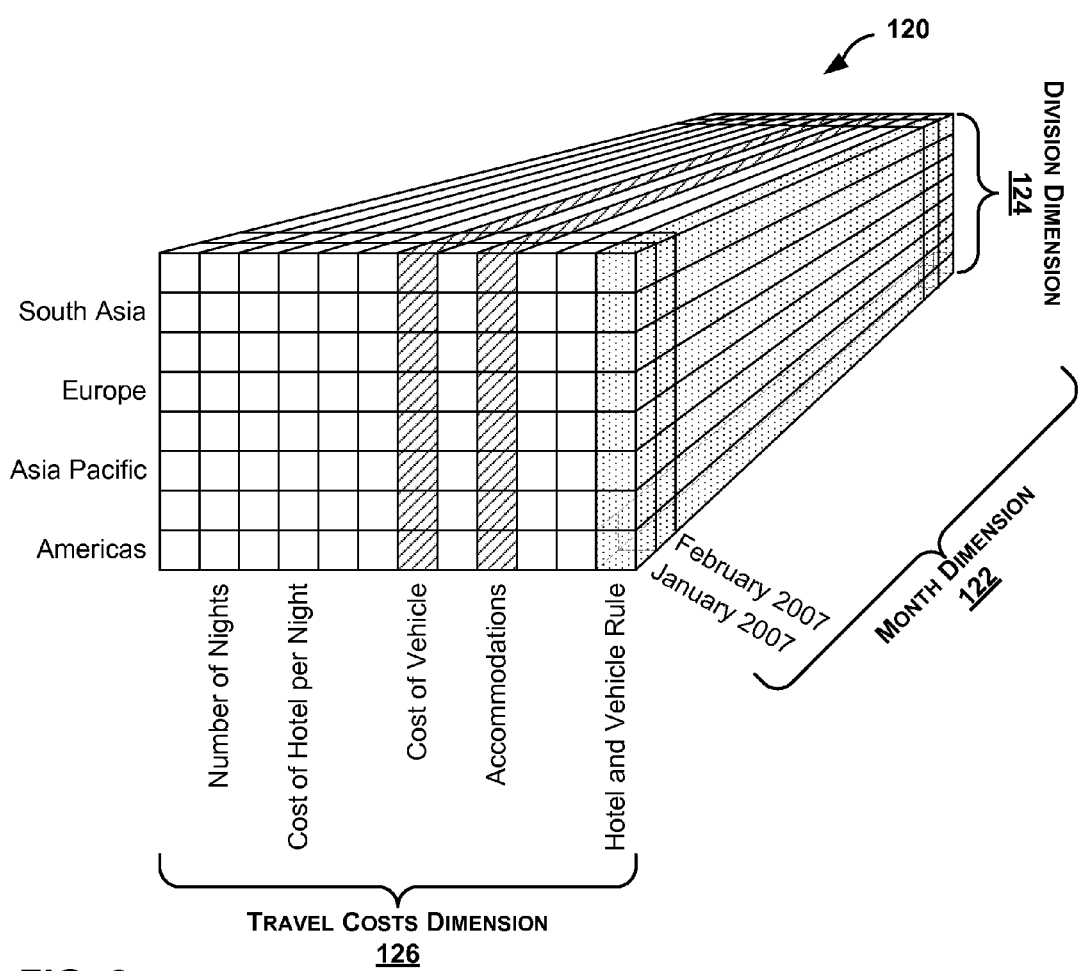
FIG. 6 is a block diagram illustrating an exemplary data cube.

FIG. 6 is a block diagram illustrating an exemplary data cube 120. Data cube 120 may be one of data cubes 32 (FIG. 2) in model slice 14. As illustrated in the example of FIG. 6, data cube 120 has three dimensions: a "month" dimension 122, a "division" dimension 124, and a "travel costs" dimension 126.

Data cube 120 includes a plurality of cells. As illustrated in FIG. 6, a cell may be visually represented as a space for storing a single value. For example, the small cube in the bottom right corner of data cube 120 may represent a single cell. Dotted lines are provided in order to illustrate rear boundaries of the cell.

The example of FIG. 6 also includes some index values on each of the dimensions. For example, "Number of Nights," "Cost of Hotel per Night," "Cost of Vehicle," "Accommodations," and "Hotel and Vehicle Rule" are index items of "travel costs" dimension 126. "South Asia," "Europe," "Asia Pacific," and "Americas" are index items of "Divisions" dimension 124. "January 2007" and "February 2007" are index items of "Month" dimension 122.

Cells in data cube 120 are divided into hyperplanes. As visually represented in FIG. 6, a hyperplane is a "slab" of cells. Such a "slab" may also be referred to as a "slice." For example, a "slab" of cells along the right side of data cube 120 is shaded with small dots. All cells in this "slab" are associated with the same index value of "travel costs" dimension, but may be associated with different index values in "month" dimension 122 and "division" dimension 124. In other words, this "slab" of cells extends along "month" dimension 122 and "division" dimension 124, but does not extend along "travel costs" dimension 126. For this reason, this "slab" of cells may be said to be a hyperplane of "travel costs" dimension 126. Furthermore, this "slab" of cells is associated with the "Hotel and Vehicle Rule" index item of "travel costs" dimension 126. For this reason, this "slab" of cells may be referred to herein as the "Hotel and Vehicle Rule" hyperplane of "travel costs" dimension 126.

An individual cell in data cube 120 may be identified by specifying a hyperplane of the "month" dimension, a hyperplane of the "division" dimension, and a hyperplane of the "travel costs" dimension. For example, the cell in the bottom right corner of data cube 120 may be identified by specifying the "January 2007" hyperplane of the "month" dimension, the "Americas" hyperplane of the "division" dimension, and the "Hotel and Vehicle Rule" hyperplane of the "travel costs" dimension.

As used in this disclosure, a first cell in a first hyperplane of a first dimension "corresponds" to a second cell in a second hyperplane of the first dimension when the first cell and the second cell are, for every other dimension in a data cube, in the same hyperplane. For example, a first cell may be identified by the "January 2007" hyperplane of the "month" dimension, the "Americas" hyperplane of the "division" dimension, and the "Hotel and Vehicle Rule" hyperplane of the "travel costs" dimension. A second cell may be identified by the "January 2007" hyperplane of the "month" dimension, the "Americas" hyperplane of the "division" dimension, and the "Accommodations" hyperplane of the "travel costs" dimension. In this example, the second cell "corresponds" to the first cell because the first cell and the second cell are in different hyperplanes of the "travel costs" dimension, but are in the same hyperplane of the "month" dimension and the same hyperplane of the "division" dimension.

Data cube 120 may be associated with one or more rule objects. For example, a rule object having the name "Hotel and Vehicle Rule" may be associated with data cube 120. This rule object may specify "travel costs" dimension 126 as the expression dimension. In this example, the rule object may specify a validation expression. The validation expression may specify one or more index values of "travel costs" dimension 126 as operands. For instance, the validation expression may specify the "Cost of Vehicle" index item and the "Accommodations" index item as operands. Because the validation expression specifies the "Cost of Vehicle" index item and the "Accommodations" index item as operands, this disclosure may refer to the "Cost of Vehicle" hyperplane in the "travel costs" dimension and the "Accommodations" hyperplane in the "travel costs" dimension as "operand hyperplanes." In the example of FIG. 6, these operand hyperplanes are shaded with diagonal lines. Furthermore, the "Hotel and Vehicle Rule" hyperplane of the "travel costs" dimension may store the results of evaluating corresponding cells in the operand dimensions. For this reason, the "Hotel and Vehicle Rule" hyperplane of the "travel costs" dimension may be referred to herein as the "validation results hyperplane." As illustrated in the example of FIG. 6, the validation results hyperplane is shaded with small dots.

To illustrate the relationship between cells in the operand hyperplanes and cells in the validation results hyperplane, consider the following example. Cell $C_{January, Americas, Cost\ of\ Vehicle}$, cell $C_{January, Americas, Accommodations}$, and cell $C_{January, Americas, Hotel\ and\ Vehicle\ Rule}$ are mutually corresponding cells. Cells $C_{January, Americas, Cost\ of\ Vehicle}$ and cell $C_{January, Americas, Accommodations}$ are cells in operand hyperplanes and cell $C_{January, Americas, Hotel\ and\ Vehicle\ Rule}$ is a cell in the validation results hyperplane. The "Hotel and Vehicle Rule" rule object may specify that values in cells of the "Cost of Vehicle" hyperplane plus values in corresponding cells of the "Accommodations" hyperplane must be less than $10,000. Hence, if the value in cell $C_{January, Americas, Cost\ of\ Vehicle}$ plus the value in cell $C_{January, Americas, Accommodations}$ is less than $10,000, the value in cell $C_{January, Americas, Hotel\ and\ Vehicle\ Rule}$ contains the value "true." On the other hand, if the value in cell $C_{January, Americas, Cost\ of\ Vehicle}$ plus the value in cell $C_{January, Americas, Accommodations}$ is greater than $10,000, the value in cell $C_{January, Americas, Hotel\ and\ Vehicle\ Rule}$ contains the value "false."

Figure 7:
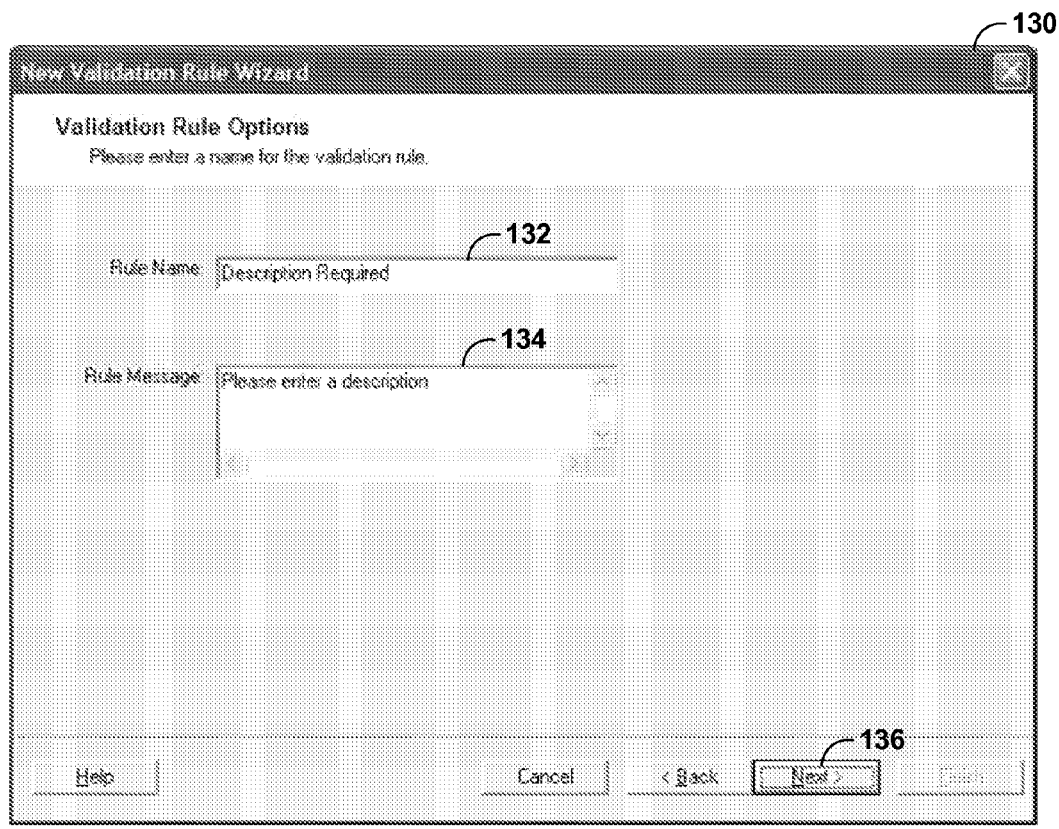
FIGS. 7-11 are screen shots illustrating exemplary user interface windows representing stages of validation rule wizard.

FIG. 7 is a screen shot illustrating an example window 130 containing a first stage of validation rule wizard. When model developer 21 wishes to create a new rule object, model developer 21 may interact with administrative interface 20 to request that administrative interface 20 launch a validation rule wizard. In response to this request, administrative interface 20 may display window 130.

As illustrated in the example of FIG. 7, model developer 21 may enter a rule name of a new rule object into a text box 132 in window 130. In this way, model developer 21 may cause the new rule object to specify a rule name. In addition, model developer 21 may enter a rule message in a text box 134 in window 130 that will be shown to the user when the rule fails. After model developer 21 enters a rule name and a rule description, model developer 21 may click a "Next" button 136 in order to move to a next stage of the validation rule wizard.

Figure 8:
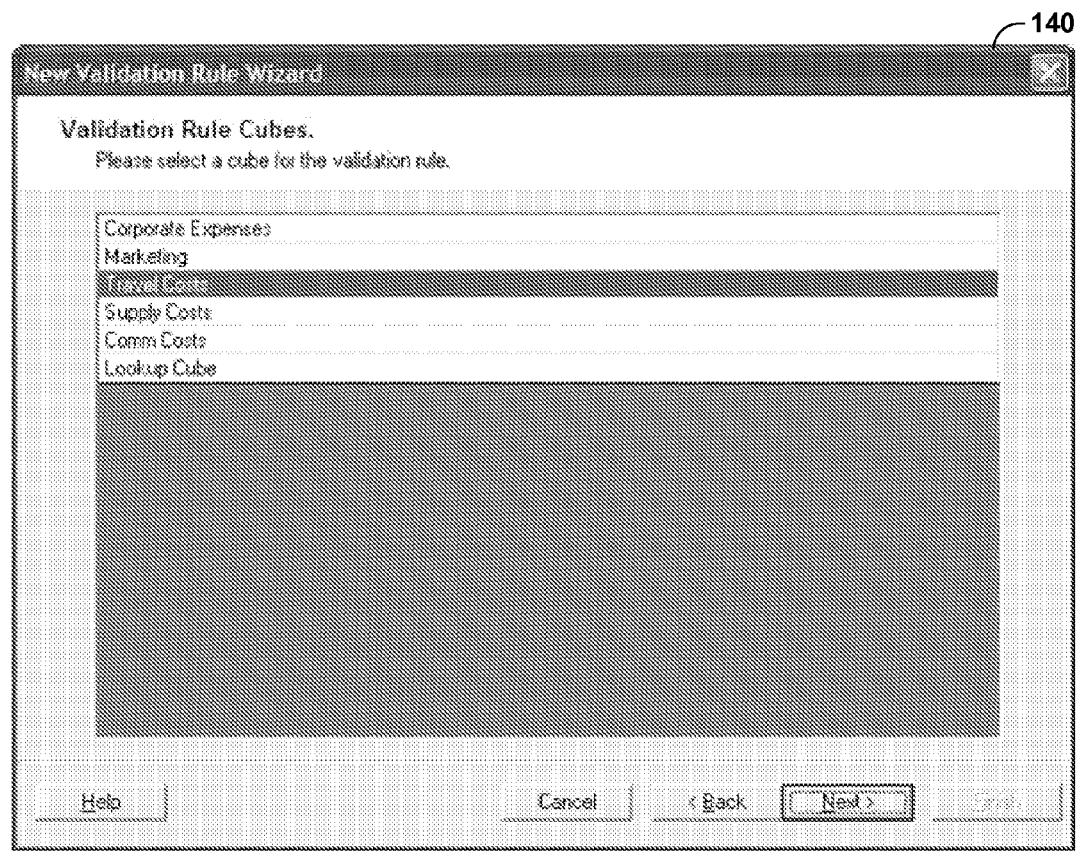

FIG. 8 is a screen shot illustrating an exemplary window 140 that contains a second stage of the validation rule wizard. Window 140 displays a list of available data cubes in model 12. As illustrated in the example of FIG. 8, window 140 lists a "corporate expenses" data cube, a "marketing" data cube, a "supply costs" data cube, a "comm. costs" data cube, and a "lookup data cube."

Model developer 21 may select one of the data cubes listed in window 140. In the example of FIG. 8, model developer 21 has selected the "Travel Costs" data cube. When model developer 21 selects one of the data cubes, the validation rule wizard may cause the new rule object to specify the selected data cube.

Figure 9:
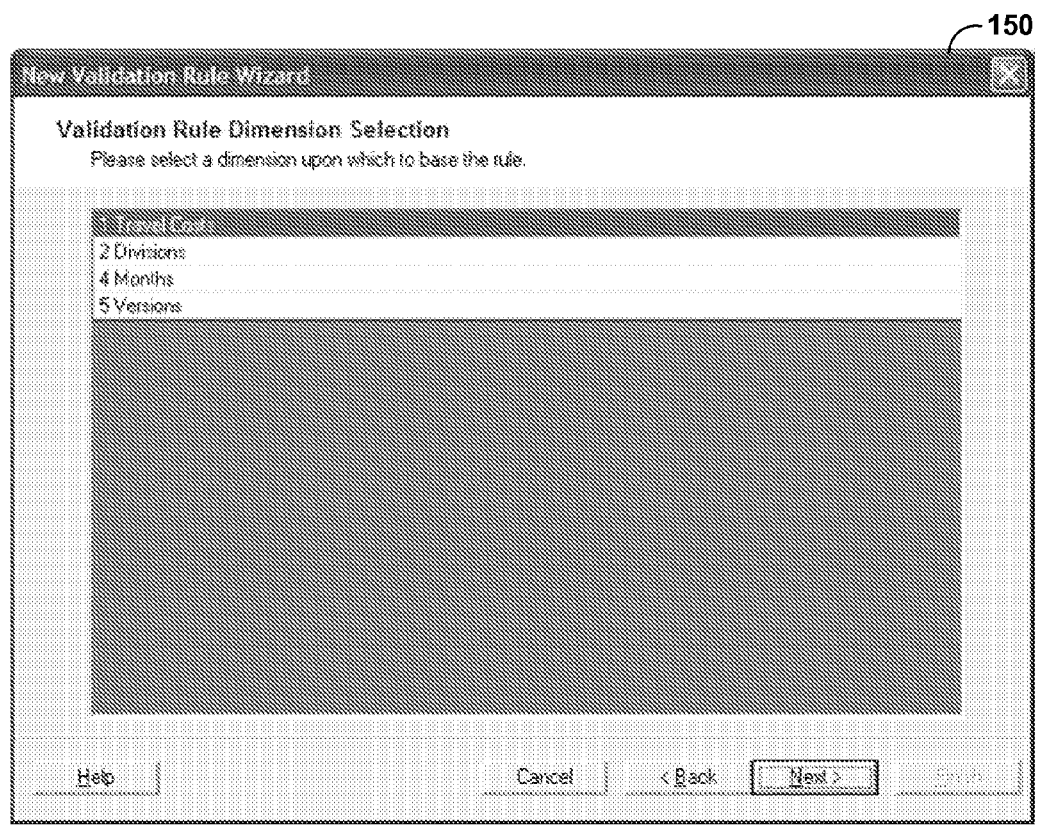

FIG. 9 is a screen shot illustrating an exemplary window 150 that contains a third stage of the validation rule wizard. Window 150 displays a list of dimensions in the selected data cube. As illustrated in the example of FIG. 9, window 150 lists a "Travel Costs" dimension, a "Divisions" dimension, a "Months" dimension, and a "Versions" dimension.

Model developer 21 may select on of the dimensions listed in window 150. In the example of FIG. 9, model developer 21 has selected the "Travel Costs" dimension. When model developer 21 selects one of the dimensions, the validation rule wizard may cause the new rule object to specify the selected dimension as the expression dimension of the new rule object.

Figure 10:
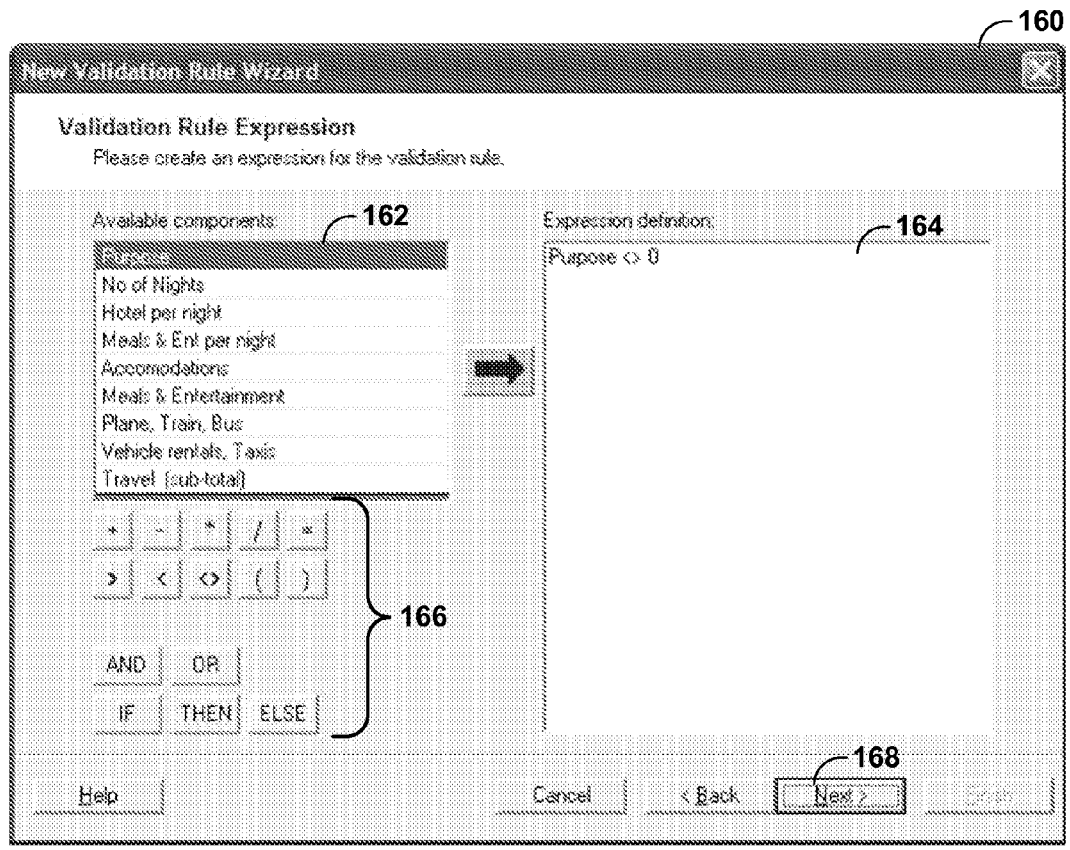

FIG. 10 is a screen shot illustrating an exemplary window 160 that contains a fourth stage of the validation rule wizard. Window 160 contains an "available components" pane 162 and an "expression definition" pane 164. "Available components" pane 162 contains a list of index items of the selected dimension. As illustrated in the example of FIG. 10, "available components" pane 162 lists a "purpose" index item, a "no. of nights" index item, a "hotel per night" index item, a "meals and entertainment per night" index item, an "accommodations" index item, a "meals and entertainment" index item, a "plane, train, bus" index item, a "vehicle rentals, taxis" index item, and a "travel (sub-total)" index item.

Window 160 also contains a set of arithmetic and logical operators 166. Model developer 21 may select one or more index items from "available components" pane 162 and one or more of operators 166 in order to construct a validation expression in "expression definition" pane 168. As illustrated in the example of FIG. 10, model developer 21 has constructed the validation expression "Purpose < >0". This validation expression may indicate that the cells in the "Purpose" hyperplane in the "Travel Costs" dimension of the "Travel Costs" data cube must not be empty. In other words, this validation expression requires a user to enter a purpose for the travel.

After model developer 21 constructs the validation expression, model developer 21 may click a "next" button 168 to move to the next stage of the validation rule wizard.

Figure 11:
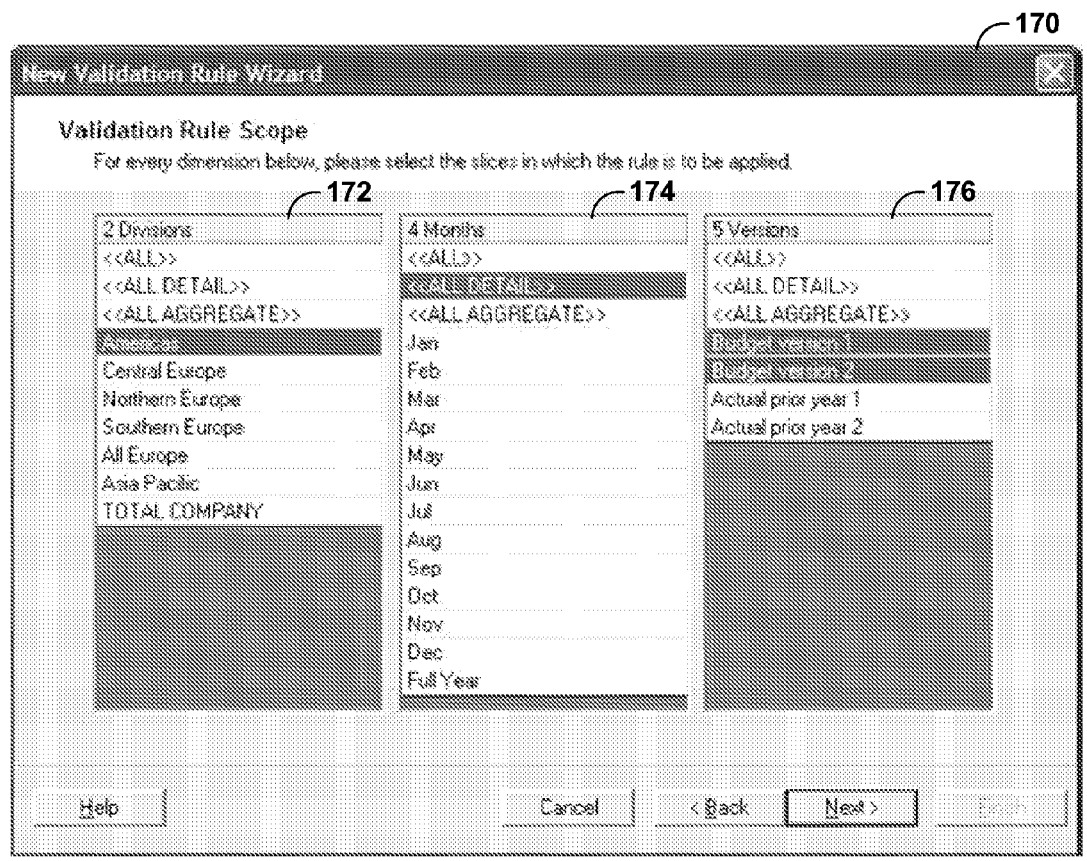

FIG. 11 is a screen shot illustrating an exemplary window 170 that contains a fifth stage of the validation rule wizard. Window 170 allows model developer 21 to define a scope of the new rule object. In other words, window 170 allows model developer 21 to specify the scoping dimensions of the new rule object. In the example of FIG. 11, window 170 includes panes 172, 174, and 176. Pane 172 lists index items in the "Divisions" dimension of the selected data cube, pane 174 lists index items in the "Months" dimension of the selected data cube, and pane 176 lists index items in the "Versions" dimension of the selected data cube. In addition, each of panes 172, 174, and 176 include an "<<ALL>>" index item, an "<<ALL DETAIL>>" index item, and an "<<ALL AGGREGATE>>" index item. The "<<ALL>>" index item indicates all index items in a dimension. The "<<ALL DETAIL>>" index item indicates all "detail" index items in a dimension. As discussed above, values in cells of a hyperplane associated with a "detail" index item are not dependent on values in other cells. The "<<ALL AGGREGATE>>" index item indicates all "aggregate" index items in a dimension. As discussed above, values in cells of a hyperplane associated with an "aggregate" index item are dependent on values in other cells. In other words, the values in cells of a hyperplane associated with an "aggregate" index item are calculated from the values in other cells.

Model developer 21 may select one or more index items in each of panes 172, 174, and 176. As illustrated in the example of FIG. 11, model developer 21 has selected the "Americas" index item in the "Divisions" dimension, the "<<ALL DETAIL>>" index item in the "Months" dimension, and the "Budget Version 1" and "Budget Version 2" index items in the "Versions" dimension. In this case, the scope of the new rule object may limited to cells in the hyperplane of the new rule object in the "Travel Costs" dimension that are also in the "Americas" hyperplane of the "Divisions" dimension, in any of hyperplane in the "Month" dimension associated with a "detail" index item, and either in the "Budget Version 1" hyperplane or the "Budget Version 2" hyperplane of the "Version dimension." In other words, the new rule object only applies to travel cost data for the "Americas" division during the months January through December in the first or second version of a budget.

Figure 12:
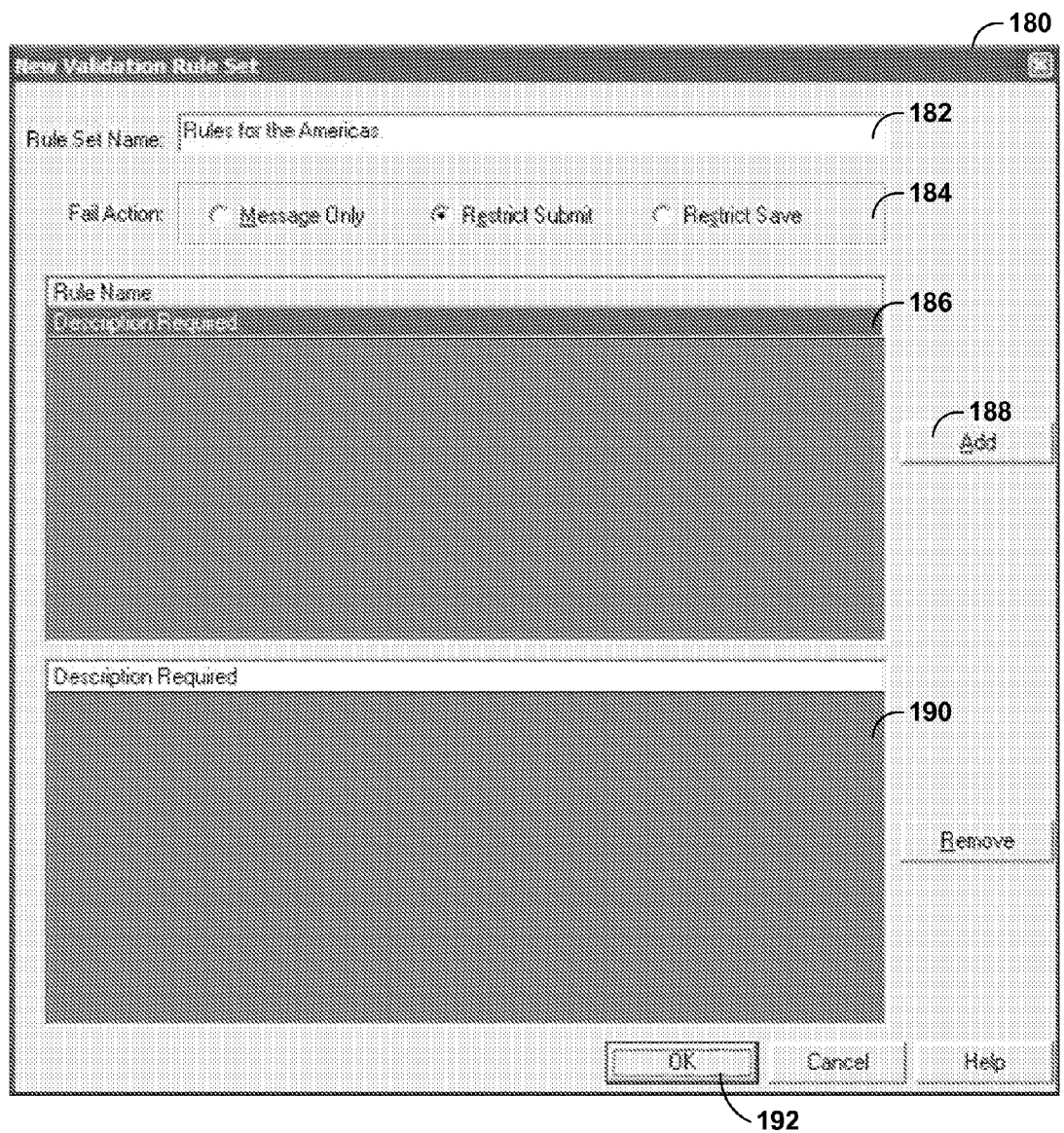
FIG. 12 is a screen shot illustrating an exemplary window that enables an administrator to create a rule set object.

FIG. 12 is a screen shot illustrating an exemplary window 180 that enables model developer 21 to create a rule set object. After model developer 21 creates one or more rule objects, model developer 21 may wish to create a new rule set object. To create a new rule set object, model developer 21 may cause administrative interface 20 to display window 180.

As illustrated in the example of FIG. 12, window 180 may include a text box 182. Model developer 21 may use text box 182 to enter a name for a new rule set object. In this example, model developer 21 has entered the name "Rules for the Americas" as a name for the new rule set object. Window 180 also includes a set of radio buttons 184. Model developer 21 may use radio buttons 184 to select a failure action for the new rule set object. In this example, model developer 21 has selected the "Restrict Submit" fail action.

In addition, window 180 includes a pane 186 that lists available rule objects. In the example of FIG. 12, there is only one available rule object, the "Description Required" rule object. Model developer 21 may cause the new rule set object to specify an available rule object by selecting the rule object in pane 186 and then clicking on an "Add" button 188. When model developer 21 selects a rule object in pane 186 and clicks on "Add" button 188, the selected rule object may appear in a second pane 190. As illustrated in the example of FIG. 12, model developer 21 has selected the "Description Required" rule object and caused the "Description Required" rule object to appear in pane 190. After model developer 21 provides a name for the rule set object in text box 182, specifies a failure action using radio buttons 184, and adds one or more rule objects to pane 190, model developer 21 may select an "OK" button 192 in order to create the new rule set object.

Figure 13:
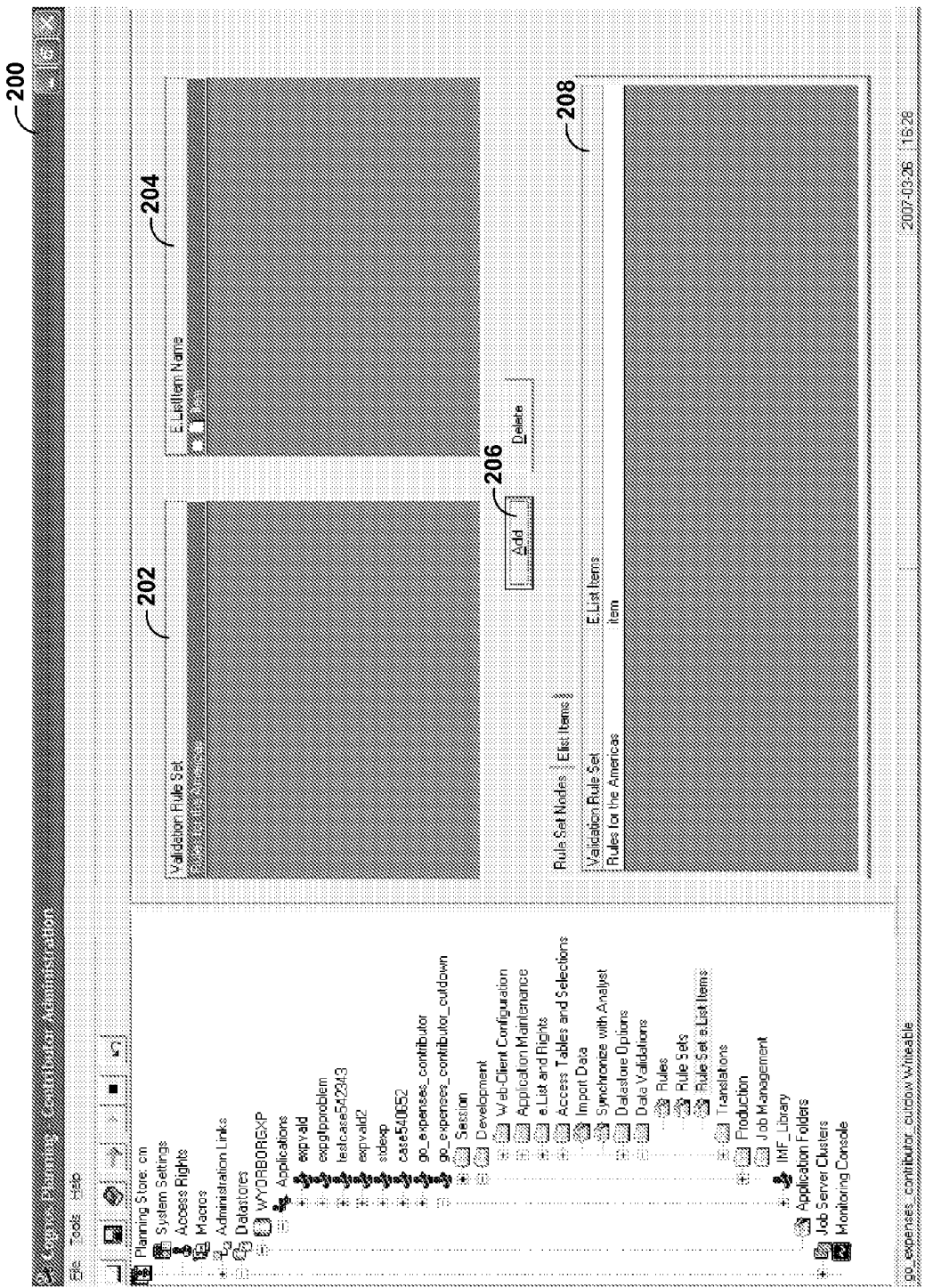
FIG. 13 is a screen shot illustrating an exemplary window that enables the administrator to map a rule set object to an "e-list" index item.

FIG. 13 is a screen shot illustrating an exemplary window 200 that enables model developer 21 to map a rule set object to an "e-list" index item. Window 200 includes a pane 202 that lists available rule set objects. For example, pane 202 lists the "Rules for the Americas" rule set object that was created in the example of FIG. 12. In addition, window 200 includes a pane 204 that lists available index items in the "e-list." For example, pane 204 lists the index item "item."

Model developer 21 may select one or more rule set objects from pane 202 and one or more "e-list" index items from pane 204. Model developer 21 may then click an "Add" button 206 in window 200. When model developer 21 clicks "Add" button 206, administrative interface 20 may map the selected rule set objects to the selected "e-list" index items. Window 200 may display the mapping from the selected rule set object to the selected "e-list" index items in a pane 208. In the example of FIG. 13, pane 208 shows that model developer 21 has mapped the "Rules for the Americas" rule set object to the "item" index item.

In one or more exemplary embodiments, the functions described may be implemented in hardware, software, and/or firmware, or any combination thereof. If implemented in hardware, the functions may be implemented in one or more microprocessors, microcontrollers, digital signal processors (DSPs), application specific integrated circuits (ASICs), field programmable gate arrays (FPGAs), or the like. Such components may reside within a communication system, data writing and/or reading system, or other systems. If implemented in software, the functions may be stored as one or more instructions or code on a computer-readable medium. Computer-readable media includes computer storage media. A storage medium may be any available media that can be accessed by a computer. By way of example, and not limitation, such computer-readable media can comprise random-access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Storage media may comprise computer program products. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various embodiments of the invention have been described. These and other embodiments are within the scope of the following claims.

The invention claimed is:

1. A method comprising:
   storing, by a computing device, a multidimensional data cube that includes:
   (a) one or more data hyperplanes associated with members of a first dimension of the data cube, wherein the data hyperplanes have cells that contain data; and
   (b) a validation results hyperplane associated with a member of the first dimension of the data cube, wherein the validation results hyperplane has cells that contain results that indicate whether data in corresponding cells of the data hyperplanes comply with a validation rule, and wherein the validation rule provides a validation expression specifying one or more of the data hyperplanes as operand hyperplanes;
   causing the cells in the validation results hyperplane to indicate whether data in corresponding cells in the operand hyperplanes complies with the validation expression; and
   submitting data contained in the cells of the operand hyperplanes when data contained in one or more cells of the validation results hyperplane indicate that data contained in corresponding cells of the operand hyperplanes complies with the validation expression.

2. The method of claim 1, wherein a first cell in a first hyperplane of a first dimension of a data cube corresponds to a second cell in a second hyperplane of the first dimension when the first cell and the second cell are, for every other dimension in the data cube, in a common hyperplane.

3. The method of claim 1, wherein the validation rule represents a policy of an enterprise.

4. The method of claim 1, wherein the data contained in cells of the data hyperplanes comprises enterprise planning data.

5. The method of claim 1, wherein the method further comprises receiving the multi-dimensional data cube from a server via a computer network.

6. The method of claim 5, wherein submitting data contained in the cells of the operand hyperplanes comprises submitting data in the data cube to the server when the data in the data cube complies with the validation rule.

7. The method of claim 1, wherein the method further comprises:
    storing the validation rule, wherein the validation rule further specifies the first dimension of the data cube as an expression dimension.

8. The method of claim 7,
    wherein the method further comprises identifying cells in the validation results hyperplane to which the validation rule is applicable.

9. The method of claim 8,
    wherein, for each dimension in the data cube other than the expression dimension, the validation rule specifies a hyperplane as a scoping hyperplane of the dimension; and
    wherein identifying cells comprises identifying a cell in the validation results hyperplane that is also in the scoping hyperplanes of each of the other dimensions.

10. The method of claim 8,
    wherein the method further comprises determining whether the validation rule is applicable to an entity who entered the data in the data cube; and
    wherein identifying cells comprises identifying the cells in the validation results hyperplane when the validation rule is applicable to the entity who entered the data in the data cube.

11. The method of claim 10, wherein the method further comprises:
    storing a rule set object that specifies one or more validation rules, wherein the rule set object is associated with one or more users; and
    wherein determining whether the validation rule is applicable to the user comprises determining that the validation rule is applicable to the user when the validation rule is one of the validation rules specified by the rule set object and when the user is one of the users associated with the rule set object.

12. The method of claim 11,
    wherein the rule set object specifies a failure action; and
    wherein the method further comprises performing the failure action when the validation rule is applicable to the entity and when one or more of the identified cells in the validation results hyperplane indicate that data contained in corresponding cells in the operand hyperplanes does not comply with the validation expression.

13. The method of claim 12, wherein performing the failure action comprises preventing the entity from submitting data contained in the corresponding cells in the operand hyperplanes.

14. The method of claim 11, wherein the rule set object is associated with a role within an enterprise performed by the entity.

15. The method of claim 1, wherein causing the cells in the validation results hyperplane to indicate whether data in corresponding cells of the operand hyperplanes complies with the validation expression comprises:
    generating new values by recalculating data in the data cube; and
    storing the new values into appropriate cells in the data cube.

16. The method of claim 15, wherein generating new values comprises:
    adding calculation items associated with the identified cells into a calculation list associated with the data cube; and
    generating the new values by processing a set of calculation items in a calculation list associated with the data cube,
    wherein each of the calculation items specifies an operation to recalculate values in cells in a different hyperplane of the data cube.

17. The method of claim 16,
    wherein a first one of the calculation items specifies an operation to recalculate values in cells of the validation results hyperplane;
    wherein storing the new values into appropriate ones of the identified cells comprises storing, in cells of the validation results hyperplane, values that result from processing the first one of the calculation items.

18. The method of claim 1, wherein the data cube includes three or more dimensions.

19. A device comprising:
    at least one processor;
    a multidimensional data cube that includes:
        (a) one or more data hyperplanes associated with members of a first dimension of the data cube, wherein the data hyperplanes have cells that contain data; and
        (b) a validation results hyperplane associated with a member of the first dimension of the data cube, wherein the validation results hyperplane has cells that contain results that indicate whether data in corresponding cells of the data hyperplanes comply with a validation rule, and wherein the validation rule provides a validation expression specifying in one or more of the data hyperplanes as operand hyperplanes; and
    a software system executable by the at least one processor, wherein the software system comprises a calculation engine that causes the cells in the validation results hyperplane to indicate whether data in corresponding cells in the operand hyperplanes complies with the validation expression, and
    wherein the software system further causes the device to submit data contained in the cells of the operand hyperplanes when data contained in one or more cells of the validation results hyperplane indicate that data contained in corresponding cells of the operand hyperplanes complies with the validation expression.

20. The device of claim 19, wherein a first cell in a first hyperplane of a first dimension of a data cube corresponds to a second cell in a second hyperplane of the first dimension when the first cell and the second cell are, for every other dimension in the data cube, in a common hyperplane.

21. The device of claim 19, wherein the validation rule represents a policy of an enterprise.

22. The device of claim 19, wherein the data comprises enterprise planning data.

23. The device of claim 19, wherein the software system submits data in the data cube to a server via a computer network when the data in the data cube complies with the validation rule.

24. The device of claim 19, wherein the
validation rule further specifies the first dimension of the data cube as an expression dimension.

25. The device of claim 24, wherein the calculation engine identifies cells in the validation results hyperplane to which the validation rule is applicable.

26. The device of claim 25,
wherein, for each dimension in the data cube other than the expression dimension, the validation rule specifies a hyperplane as a scoping hyperplane of the dimension; and
wherein the calculation engine identifies the cells in part by identifying a cell in the validation results hyperplane that is also in the scoping hyperplane of each of the other dimensions.

27. The device of claim 25, wherein the calculation engine determines whether data in the data cube complies with the validation rule in part by determining whether the validation rule is applicable to a user who entered the data in the data cube and by identifying the cells in the validation results hyperplane when the validation rule is applicable to a user who entered the data in the data cube.

28. The device of claim 27,
wherein the device further comprises a rule set object that specifies one or more validation rules in the model, and
wherein the rule set object is associated with one or more users; and
wherein the calculation engine determines whether the validation rule is applicable to the user in part by determining that the validation rule is applicable to the user when the validation rule is one of the validation rules specified by the rule set object and when the user is one of the users associated with the rule set object.

29. The device of claim 28,
wherein the rule set object specifies a failure action; and
wherein the device further comprises a session manager that performs the failure action when the validation rule is applicable to the user and when one or more of the identified cells in the validation results hyperplane indicate that data contained in corresponding cells in the operand hyperplanes does not comply with the validation expression.

30. The device of claim 29, wherein, when the session manager performs the failure action, the export manager prevents the user from submitting the data contained in the corresponding cells in the operand hyperplanes.

31. The device of claim 28, wherein the rule set object is associated with a role within an enterprise performed by the user.

32. The device of claim 24,
wherein the calculation engine identifies data cubes that store data that requires recalculation due to changes in data of the data cube;
wherein the calculation engine generates new values by recalculating data in the identified cells; and
wherein the calculation engine stores the new values into appropriate ones of the identified cells, thereby causing cells in the validation results hyperplane to indicate whether the validation expression holds for data in corresponding cells in the operand hyperplanes.

33. The device of claim 32,
wherein the calculation engine comprises a calculation list that stores calculation items associated with the data cube,
wherein each of the calculation items instructs the calculation engine how to calculate values in a different hyperplane of the data cube, and
wherein the calculation engine processes each one of the calculation items in order to generate the new values.

34. The device of claim 33,
wherein a first one of the calculation items specifies an operation to calculate results in cells of the validation results hyperplane, and
wherein when the calculation engine performs the first one of the calculation items, the calculation engine stores the new values into appropriate ones of the cells in the validation results hyperplane.

35. The device of claim 19, wherein the data cube includes three or more dimensions.

36. A computer-readable storage medium comprising instructions that, when executed, cause a processor to:
store a multidimensional data cube that includes:
(a) one or more data hyperplanes associated with members of a first dimension of the data cube, wherein the data hyperplanes have cells that contain data; and
(b) a validation results hyperplane associated with a member of the first dimension of the data cube, wherein the validation results hyperplane has cells that contain results that indicate whether data in corresponding cells of the data hyperplanes comply with a validation rule, and wherein the validation rule provides a validation expression specifying one or more of the data hyperplanes as operand hyperplanes;
cause the cells in the validation results hyperplane to indicate whether data in corresponding cells in the operand hyperplanes complies with the validation expression; and
submit data contained in the cells of the operand hyperplanes when data contained in one or more cells of the validation results hyperplane indicate that data contained in corresponding cells of the operand hyperplanes complies with the validation expression.

37. The computer-readable storage medium of claim 36, wherein the instructions further cause the processor to:
store the validation rule, wherein the validation rule further specifies the first dimension of the data cube as an expression dimension.

38. The computer-readable storage medium of claim 37, wherein the instructions further cause the processor identify cells in the validation results hyperplane to which the validation rule is applicable.

39. The computer-readable storage medium of claim 36, wherein the instructions cause the processor to cause cells in the validation results hyperplane to indicate whether data in corresponding cells of the operand hyperplanes complies with the validation expression by causing the processor to:
recalculate data in cells of the validation results hyperplane; and
store the recalculated data in the cells of the validation results hyperplane.

* * * * *